US010455188B2

(12) United States Patent
Karpinsky

(10) Patent No.: US 10,455,188 B2
(45) Date of Patent: Oct. 22, 2019

(54) CORRELATING UI WITH CPU STACKS FOR PROFILING SESSIONS

(71) Applicant: Microsoft Technology Licensing, LLC, Redmond, WA (US)

(72) Inventor: Nikolaus L. Karpinsky, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 15/356,180

(22) Filed: Nov. 18, 2016

(65) Prior Publication Data

US 2018/0146157 A1 May 24, 2018

(51) Int. Cl.
| | |
|---|---|
| H04N 5/775 | (2006.01) |
| G11B 27/10 | (2006.01) |
| H04N 7/18 | (2006.01) |
| G06F 11/36 | (2006.01) |
| G06F 11/34 | (2006.01) |

(52) U.S. Cl.
CPC ......... *H04N 5/775* (2013.01); *G06F 11/3466* (2013.01); *G06F 11/36* (2013.01); *G06F 11/3636* (2013.01); *G06F 11/3664* (2013.01); *G11B 27/10* (2013.01); *H04N 7/188* (2013.01)

(58) Field of Classification Search
CPC .... H04N 5/775; H04N 7/188; G06F 11/3636; G06F 11/3664; G11B 27/10
See application file for complete search history.

(56) References Cited

U.S. PATENT DOCUMENTS

| | | |
|---|---|---|
| 7,533,371 B1 | 5/2009 | Johns et al. |
| 7,721,268 B2 | 5/2010 | Loh et al. |
| 8,407,605 B2 | 3/2013 | Go et al. |
| 2004/0189667 A1 | 9/2004 | Beda et al. |
| 2009/0077046 A1* | 3/2009 | Narahara ............ G06F 16/4387 |
| 2009/0083716 A1 | 3/2009 | Kimura |
| 2010/0017583 A1 | 1/2010 | Kuiper et al. |
| 2011/0138385 A1 | 6/2011 | Schmelter et al. |
| 2012/0159452 A1* | 6/2012 | DeLine ..................... G06F 8/34 717/125 |
| 2012/0191893 A1 | 7/2012 | Kuiper et al. |

(Continued)

OTHER PUBLICATIONS

"International Search Report and Written Opinion Issued in PCT Application No. PCT/US2017/061216", dated Jan. 30, 2018, 17 Pages.

(Continued)

*Primary Examiner* — Mishawn N. Hunter
(74) *Attorney, Agent, or Firm* — Fiala & Weaver P.L.L.C.

(57) ABSTRACT

Methods, systems, apparatuses, and computer program products are provided for correlating a user interface (UI) of an executing process with a profiling trace generated for the process. A profiling trace of a process is captured during execution of the process. A window handle associated with the process is determined. Video of a displayed window having the window handle is captured simultaneous with the capturing of the profiling trace. The displayed window displays a user interface (e.g., a graphical user interface) of the process. The captured profiling trace and the video are stored in a profiling trace object, and may be analyzed together to diagnose any problems/issues with the process.

20 Claims, 5 Drawing Sheets

(56) References Cited

U.S. PATENT DOCUMENTS

| | | |
|---|---|---|
| 2013/0227350 A1 | 8/2013 | O'riordan et al. |
| 2013/0249917 A1 | 9/2013 | Fanning et al. |
| 2014/0068068 A1 | 3/2014 | Barisal et al. |
| 2015/0169158 A1 | 6/2015 | Kyte et al. |
| 2015/0199262 A1 | 7/2015 | Bhavsar et al. |
| 2015/0202529 A1 | 7/2015 | Paradise et al. |
| 2016/0088326 A1* | 3/2016 | Solomon ............. H04N 21/254 725/12 |
| 2016/0292881 A1* | 10/2016 | Bose ................. G06K 9/00342 |
| 2018/0082340 A1* | 3/2018 | Freund .............. G06Q 30/0277 |

OTHER PUBLICATIONS

Lenahan, Tim, "Screencast Video Recorder Makes It Easy", Published on: Jul. 15, 2012, Available at: <http://android.appstorm.net/reviews/utilities/screencast-video-recorder-makes-it-easy/>, 14 pages.
Taylor, Dan, "Performance and Diagnostic Tools in Visual Studio 2015", Published on: Jul. 20, 2015, Available at: <https://blogs.msdn.microsoft.com/visualstudioalm/2015/07/20/performance-and-diagnostic-tools-in-visual-studio-2015/>, 13 pages.

\* cited by examiner

CORRELATING UI WITH CPU STACKS FOR PROFILING SESSIONS

BACKGROUND

Executing computer programs/applications, referred to herein as "processes" can suffer from problems related to buggy code, network latency issues, server problems, etc. A "profiling program" or "profiling tool" is a computer program that performs dynamic program analysis, which is the analysis of computer programs on a real or virtual processor during execution of the computer program. A profiling tool captures a trace, which is a stream of recorded events associated with the executing process under analysis, and which can be analyzed to investigate and identify problems with the process.

Multiple types of profiling tools exist. A first type uses instrumentation, where the code of the process to be analyzed is augmented with instrumentation code ("probes"). A second type of profiling tool uses statistical sampling at internals by interacting with the central processing unit (CPU) executing the process to generate profiling trace information. By performing profiling according to either type over time, a model of what the computer was doing over time may be generated and analyzed to troubleshoot the process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for correlating a user interface (UI) of an executing process with a profiling trace generated for the process. Such correlating enables more efficient analysis of the profiling trace.

In an aspect, a profiling trace of a process is captured during execution of the process. A window handle associated with the process is determined. Video of a displayed window having the window handle is captured simultaneously with the capturing of the profiling trace. The displayed window displays a user interface (e.g., a graphical user interface) of the process. The captured profiling trace and the video are stored in a profiling trace object, and may be analyzed together to diagnose any problems/issues with the process.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
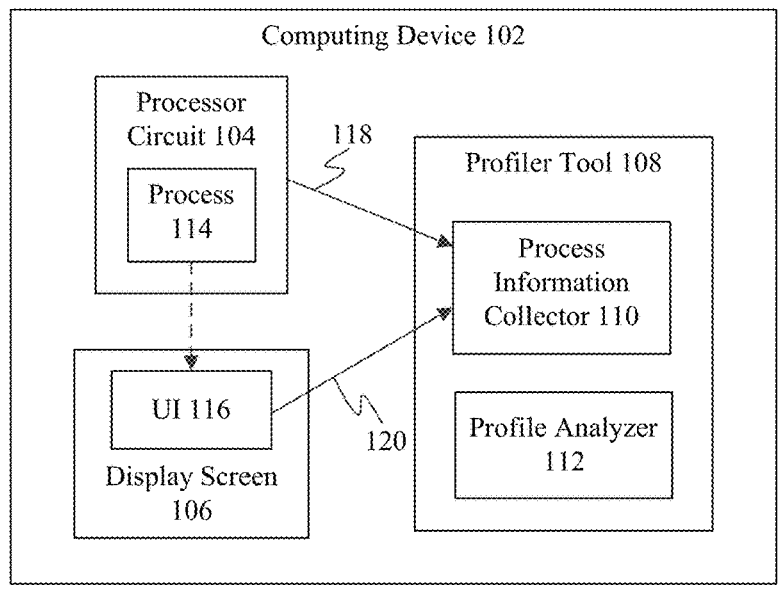
FIG. 1 shows a block diagram of a computing device that contains a profiling tool that enables a displayed user interface (UI) of a process to be correlated with a profiling trace generated for the process, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Correlating a Process UI with CPU Operations

Computer programs/applications, referred to herein as "processes" can suffer from problems related to buggy code, network latency issues, server problems, etc. A "profiling program" or "profiling tool" is a computer program that performs dynamic program analysis, which is the analysis of computer programs on a real or virtual processor during execution of the computer program. A profiling tool captures a trace, which is a stream of recorded events associated with the executing process under analysis, which can be used to investigate and identify problems with the process. The profiling trace may include a series of times at which events are recorded, including memory usage, the usage of particular instructions/functions, the frequency and/or duration of function calls, etc.

A couple of types of profiling tools exist. A first type uses instrumentation, where the code of the process to be analyzed is augmented with instrumentation code ("probes"). A second type of profiling tool uses statistical sampling at intervals by interacting with the central processing unit (CPU) executing the process to generate profiling trace information. By performing profiling according to either type over time, a model of what the computer was doing may be generated. The profiling trace containing the monitored events may be saved as a profiling trace file.

A user of a process may encounter a problem with the process during its execution. For example, a video streaming application may have noticeable lag in video it displays. In another example, a video game application may be buggy or have coded instructions that do not operate quite right, resulting in undesired graphical artifacts or other items to be displayed during game play. As such, a profiling trace may be generated of the process during execution to capture aspects of code execution, processor operation, etc. The captured profiling trace may be analyzed by a developer (a person knowledgeable about generating and debugging program code) to pinpoint problems with the process, such as may exist in the process's program code, problems with network latency, etc., so that the developer can correct or mitigate the problems. The profiling trace may be generated automatically (e.g., with or without the user's knowledge) or manually (e.g., by command of the user or developer, who may be local or remote to the user and executing process).

The developer can be provided the profiling trace of the process for analysis. When receiving a profiling trace, it can be difficult for a developer to determine a portion of the profiling trace that is of interest (e.g., where an aspect of a problem with the program code of the process is most evident), and therefore should be focused upon. This is because the profiling trace can be a very large file that contains information regarding a very long execution time for the process under analysis (e.g., in terms of minutes or hours of profiled execution time). The developer may have to spend a great deal of time examining the profiling trace before actually finding the problem.

According to embodiments, during the capture of profile information (a profiling trace) for a process being run on a computer by a user, a user interface (UI) of the process is also video recorded by a video capture application of the computer. By recording the UI during capturing of the trace, the developer can be shown (in the video) what the user may have seen during the capturing of the profiling trace, such as a problem in execution of the process (e.g., lagging execution, bugs, bad code, etc.). By noting when problems become apparent in the UI in the video, the developer can determine how the user of the process arrived at a specific place within the trace, and can focus on that portion of the profiling trace for debugging purposes. This aids the developer in figuring out causality from the user perspective in the issue they are trying to fix.

According to current techniques, a GPU (graphics processing unit) profiler and memory profiler may take a screenshot of the process whenever they capture a snapshot during profiling. This is used to help the developer remember the current state of the application at that moment. However, a snapshot-oriented approach is unable to capture user activity (e.g., interacting with the UI), or other activity in the UI (e.g., freezing or glitches in displayed video, etc.). To alleviate this weakness in current techniques, embodiments capture video of the UI, and therefore are capable of determining user and process action in the UI that may be used to identify problems in the process.

According to an embodiment, when capture of a profiling trace is initiated, one or more window handles (HWNDs) associated with the profiled process may be enumerated. In the generated list of HWNDs, the root HWND may be determined, and a video may be captured of the window assigned that root HWND at a specified framerate. When the profiling trace is completed, the video may be saved as additional data in the profiling trace file (e.g., filename of ".diagsession"), and any instant or time period of the video can be replayed during post mortem analysis of the process.

Embodiments may be implemented in various ways. For instance, FIG. 1 shows a block diagram of a computing device 102 that contains a profiling tool that enables a displayed user interface (UI) of a process to be correlated with a profiling trace generated for the process, according to an example embodiment. As shown in FIG. 1, computing device 102 includes a profiler tool 108, a processor circuit 104, and a display screen 106. Profiler tool 108 includes a process information collector 110 and a profile analyzer 112. Processor circuit 104 has loaded and executes process 114. FIG. 1 is further described as follows.

Process 114 is an instance of a computer program, an application, one or more processes, etc. implemented in computer code (e.g., machine code) and executed by processor circuit 104. Processor circuit 104 is an electrical and/or optical circuit implemented in one or more physical hardware electrical circuit device elements and/or integrated circuit devices, such as a CPU (central processing unit). Processor circuit 104 may include one or more of an arithmetic logic unit (ALU), one or more memory registers that supply operands to the ALU and/or store results of ALU operations, a control unit that orchestrates fetches from memory and executions of instructions, etc. Processor circuit 104 executes process 114 either directly, or executes one or more virtual processors that execute process 114.

During execution, process 114 generates a UI 116 (a graphical user interface (GUI)) that is displayed by display screen 106. UI 116 in display screen 106 may display information associated with process 114 (e.g., video, UI controls, images, movement of the user's mouse pointer moving around and interacting with UI controls, etc.), as well as being a user interface for receiving user commands and/or other information (e.g., by touch, finger gestures, virtual keyboard, mouse pointer clicks, etc.).

Display screen 106 may be a display screen for any suitable type of display device, including an LCD (liquid crystal display), a CRT (cathode ray tube) display, an LED (light emitting diode) display, a plasma display, etc.

During execution, process 114 may experience issues that may be evident in UI 116 (e.g. lag in video, etc.) and/or user interactions with UI 116 (e.g., mouse pointer hovering over or interacting with particular UI controls, etc.).

Profiler tool 108 is a computer program that performs dynamic program analysis of computer programs such as process 114. Process information collector 110 ("collector 110") is configured to capture a recorded events stream 118 of process 114 during execution to form a profiling trace, while simultaneously capturing video 120 of UI 116. The profiling trace may include any sort of profiling information, including a series of times at which events of recorded events stream 118 are recorded, such as memory/register usage, the usage of particular instructions/functions, the frequency and/or duration of function calls, etc.

Video 120 may have the form of a video stream of any suitable video format that captures activity in UI 116 during a time period overlapping profiling trace capture. Collector 110 may perform its functions (capturing recorded events stream 118 and video 120) automatically (with or without the user's knowledge), or may be initiated by a user or developer. The developer may cause collector 110 to perform its functions with or without the user's knowledge.

Profile analyzer 112 enables a developer to view the captured profiling trace, such as in textual, graphical, and/or other form. In this way, the developer can analyze any issues/problems with process 114 by finding the calls, register values, portions of the code of process 114 indicated in the profiling trace where the issues/problems occur, etc. The developer may view video 120 to correlate problems with process 114 that are evident in video 120 with corresponding portions of the profiling trace, enabling the developer to focus in on the calls, register values, code portions, etc., indicated by the profiling trace that closely relate to the issues/problems, rather than having to peruse the profiling trace in its entirety for indications of problems.

Figure 2:
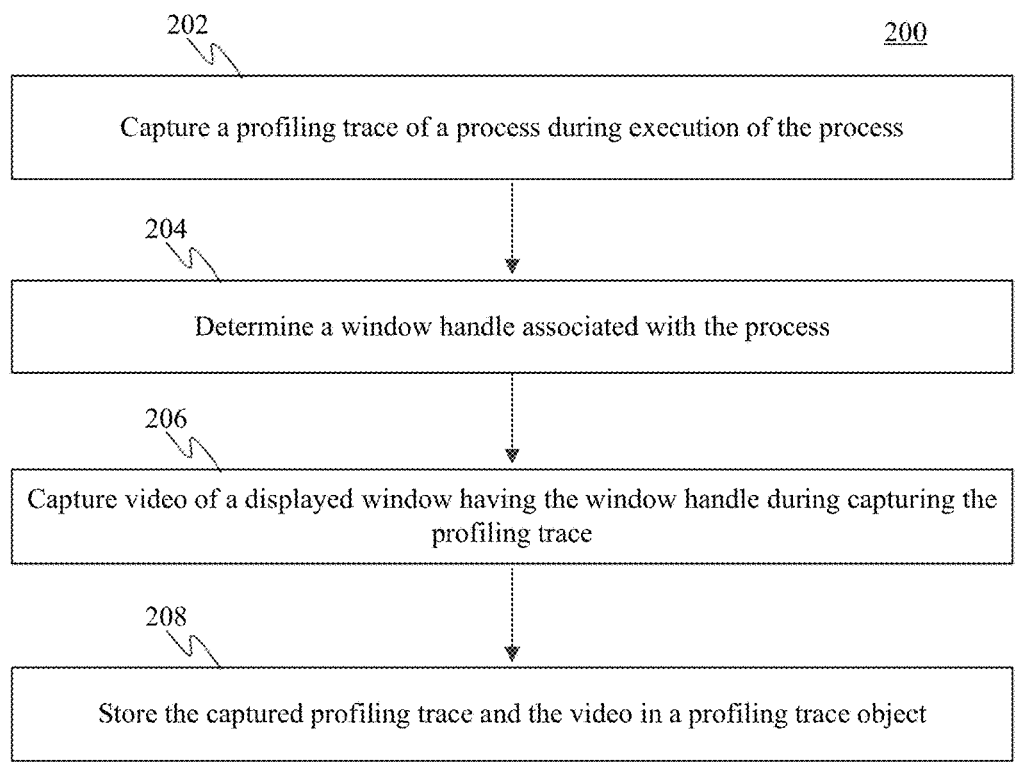
FIG. 2 shows a flowchart providing a method for correlating a UI of a process with a profiling trace generated for the process, according to an example embodiment.
Figure 3:
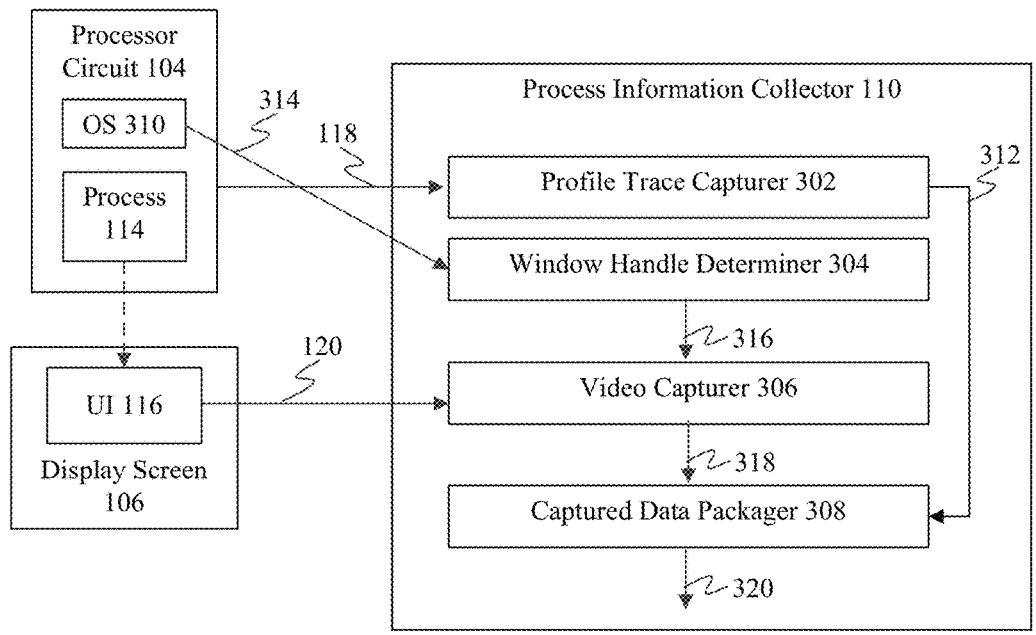
FIG. 3 shows a block diagram of a process information collector, according to an example embodiment.

Profiler tool 108 may operate in various ways to perform its functions. For instance, FIG. 2 shows a flowchart 200 providing a method for correlating a UI of a process with a profiling trace generated for the process, according to an example embodiment. Collector 110 of FIG. 1 may operate according to flowchart 200 in an embodiment. Flowchart 200 is described as follows with reference to FIG. 1 and FIGS. 3-9. FIG. 3 shows a block diagram of processor circuit 104, display screen 106, and collector 110, according to an example embodiment. As shown in FIG. 3, collector 110 may include a profile trace capturer 302, a window handle determiner 304, a video capturer 306, and a captured data packager 308. Computing device 102 of FIG. 3 and flowchart 200 are described as follows.

Flowchart 200 begins with step 202. In step 202, a profiling trace of a process is captured during execution of the process. In an embodiment, profile trace capturer 302 is configured to capture recorded events stream 118 of process 114, which are aggregated into a profiling trace indicated as profiling trace 312. As described above, recorded events stream 118 is a stream of recorded events associated with process 114. Recorded events stream 118 may include a series of times at which events are recorded, including events such as memory usage, the usage of particular instructions/functions, the frequency and/or duration of function calls, etc. Any type of information descriptive of the contents and operation of process 114 may be recorded in recorded events stream 118 and included in profiling trace 312, as would be apparent to persons skilled in the relevant art(s).

Profile trace capturer 302 may be configured in various ways to capture recorded events stream 118. For instance, profile trace capturer 302 may use instrumentation. In such an embodiment, the underlying program code of process 114 may be augmented with instrumentation code ("probes") that capture data of process 114 from within during execution to generate profiling trace information. The instrumentation code in process 114 may monitor and record events such as memory usage, the usage of particular instructions/functions, the frequency and/or duration of function calls, the latency of particular functions, etc., along with the times at which the events occur, and may communicate the recorded events to profile trace capturer 302 as recorded events stream 118. The instrumentation code may communicate the recorded events to profile trace capturer 302 in any fashion, including transmitting the events over a network (e.g., an HTTP communication), or via inter-computer communications.

In another embodiment, profile trace capturer 302 may use sampling. In such an embodiment, profile trace capturer 302 may interact with processor circuit 104 executing process 114 at intervals to generate recorded events stream 118. For instance, profile trace capturer 302 may use sampling at periodic or other intervals to record the program stack associated with processor circuit 104, determine which instruction the CPU is executing in the program, determine how much memory is being used, determine what function calls are being made, etc., generating a series of samples over time to create a statistical model.

By performing profiling according to either type over time, profile trace capturer 302 may generate a model of what the computer was doing over time. Profiling trace 312 containing the monitored events may be saved as a profiling trace file of any format (e.g., an ETL (event trace log) file format, etc.), including data in any form such as a table, an array, etc. In an embodiment, profiling trace 312 may include, for each reading, the time, the instruction pointer of processor circuit 104, the full processor stack at that point (addresses that can be matched with source code using symbols), memory register values, etc.

Figure 4:
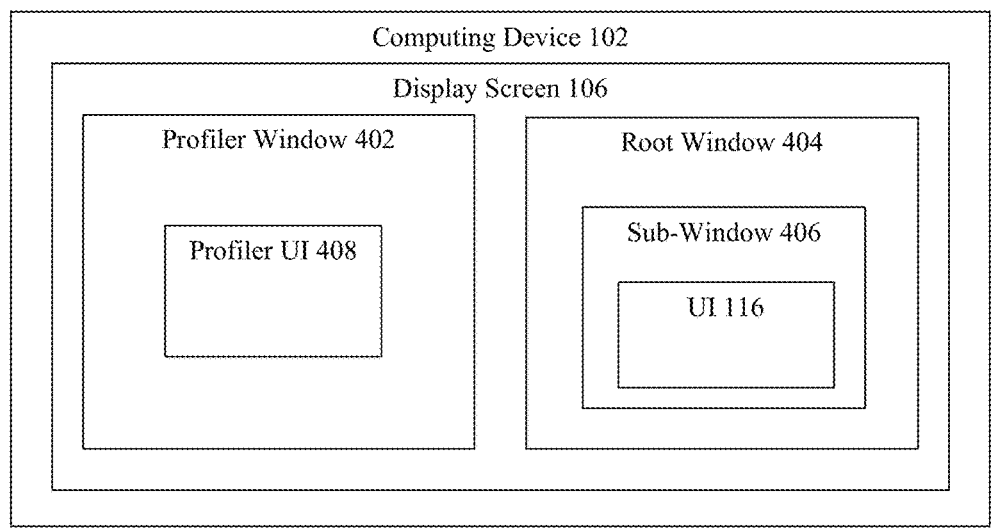
FIG. 4 shows a block diagram of a computer display screen that displays a profiling tool that generates a profiling trace for a process while capturing video of a user interface of the process, according to an example embodiment.
Figure 5:
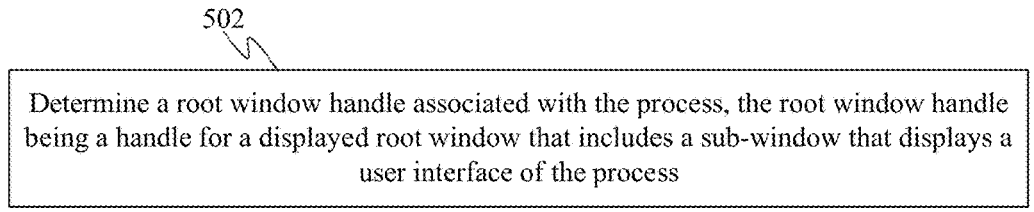
FIG. 5 shows a method for determining a root window handle of a window that displays a user interface of a process being profiled, according to an example embodiment.

Referring back to FIG. 2, in step 204, a window handle associated with the process is determined. In an embodiment, window handle determiner 304 is configured to determine a window handle for a displayed window associated with process 114. For instance, FIG. 4 shows a block diagram of display screen 106 of computing device 102 displaying a profiler window 402 and a root window 404, according to an example embodiment. Profiler window 402 is optionally present, and is a window in which a profiler UI 408 for profile tool 108 (FIG. 1) is displayed. In this example, a developer may interact with profiler UI 408 to operate profile tool 108 to cause capture of profiling trace 312 for process 114 and to capture video of UI 116 of process 114 (as further detailed below). In another embodiment, profiler 402 is not displayed on the same screen with UI 116, such as when a developer interacts with profile tool 108 on a different computing device from the computing device a user uses to execute and interact with process 114.

As described above, UI 116 is a user interface associated with process 114, and may display controls and/or other information related to process 114 during execution, as well as optionally being a user interface for process 114 to receive user commands and/or other interactions by the user. UI 116 may display any sort of information associated with executing process 114, including video, controls, etc.

In the example of FIG. 4, UI 116 is shown displayed within the bounds of root window 404. Root window 404 is an outermost window containing UI 116. In an embodiment, UI 116 is displayed directly in root window 404 (not in a sub-window thereof). In another embodiment, UI 116 is displayed in a sub-window 406, or "child" window, of root window 404. In such case, root window 404 is a "parent" window of sub-window 406. A collection of windows of any number may be cascaded in a hierarchy such that each window (except the innermost and outermost windows) is a child of a higher level window in the hierarchy, and is a parent to a lower level window in the hierarchy. Sub-window 406 may be positioned in any window in such a hierarchy.

In an embodiment, each window, including root window 404 and sub-window 406, has a unique window identifier, which may be referred to as a window handle. In this example of FIG. 3, operating system (OS) 310 (e.g., a kernel of OS 310) assigns window handles to windows displayed in display screen 106, and associates the assigned window handles with the processes that invoke the windows. OS 310 tracks the window handles and associated processes in a data structure, such as a list, where the relationship between window handles is also maintained using "pointers." A pointer associated with a window handle for a child window indicates/points to a window handle for a parent window for that child window. As such, inner windows have window handles with pointers to outer window handles. In the example of FIG. 4, windows 404 and 406 are both associated with process 114, and the window handle of sub-window 406 includes a pointer to the window handle of root window 404.

According to step 204, window handle determiner 304 determines a window handle for a displayed window associated with process 114. In particular, window handle determiner 304 determines a window handle for a window that displays UI 116 of process 114. In this manner, the determined window can be targeted for video capture (as further detailed below). In an embodiment, window handle determiner 304 requests (e.g., makes a system call for) the window handle(s) for process 114 from OS 310. OS 310 applies the request made on behalf of process 114 to the maintained window handle list, and returns the window handle(s) associated with process 114 as requested window handle(s) 314. Window handle determiner 304 outputs a specific window handle of requested window handle(s) 314 as determined window handle 316.

In the case where UI 116 is displayed directly in root window 404, and root window 404 includes no sub-windows, OS 310 may return the window handle of root window 404 (the "root window handle"). In the case where UI is not displayed directly in root window 404, but instead is displayed in a child window of root window 404, OS 310 may return the window handle of the child window (e.g., sub-window 406). In this way, the window handle of a window displaying UI 116 is returned.

However, in another embodiment, when root window 404 contains multiple windows associated with process 114, OS 310 may determine multiple window handles for process 114. Accordingly, it may not be apparent which window handle is assigned to the window that displays UI 116. In such case, a step 502 shown in FIG. 5 may be performed, in an embodiment. In step 502, a root window handle associated with the process is determined, the root window handle being a handle for a displayed root window that includes a sub-window that displays a user interface of the process. The root window can be targeted for video capture (as further detailed below), to ensure that video is also captured of the sub-window containing UI 116 displayed within.

Accordingly, in such embodiment, OS 310 or window handle determiner 304 may analyze the list of window handles, finding multiple window handles associated with process 114. OS 310 or window handle determiner 304 may then enumerate/parse the list to follow pointers from window handles of sub-windows up to the window handles of outer windows, until the outermost/root window handle is determined. This root window handle may be output by window handle determiner 304 as determined window handle 316.

Referring back to FIG. 3, in step 206, a displayed window having the window handle is captured simultaneous with capturing the profiling trace. In an embodiment, video capturer 306 receives determined window handle 316, and is configured to capture video for the window having window handle 316 at the same time profiling trace 118 is captured by profile trace capturer 302. In this manner, video capturer 306 captures video of UI 116, which may show visible issues/problems associated with process 114 that can be correlated with profile information in profiling trace 118. In an embodiment, video capturer 306 can emit one or more of start/stop/pause/resume events into profiler data to aid in correlation of captured video and captured profiling data. The correlation can be used to mitigate or correct the issues/problems with process 114, such as by editing the program code of process 114, and/or by other ways. Video capturer 306 outputs the captured video as captured video 318.

Video capturer 306 may be configured in various ways to capture on-screen video. For example, video capturer 306 may include a video codec, which is a computer program that converts raw digital video to a compressed format, as well as converting compressed video to raw digital video. In an embodiment, video capturer 306 receives raw digital video data (e.g., an array of pixel data) of the window identified by the window handle, optionally compresses the digital video data, and stores the optionally compressed digital video data in a video file of a video file format such as .wmv, .mov, .mpeg, .mp4, etc. Window handle 316 may indicate a location, size (e.g., pixel height and width), and/or other attribute(s) (e.g., image format such as RGB, etc.) of the window to be captured in video, or video capturer 306 may determine the attribute(s) in another manner, and video capturer 306 captures video (a stream of images) of the window accordingly.

Referring back to FIG. 2, in step 208, the captured profiling trace and the video are stored in a profiling trace object. As shown in FIG. 3, captured data packager 308 receives profiling trace 312 and captured video 318. In embodiments, captured data packager 308 stores profiling trace 312 and captured video 318 together in a profiling trace object 320, which may be a file or collection of files, including a file having an archive file format such as .ZIP.

Accordingly, during flowchart 200 of FIG. 2, both a profiling trace of processor activity and a video of UI activity are simultaneously captured during execution of a process. The profiling trace and video can be correlated to aid in honing in on problems with the process. For instance, a developer may view of the video of the UI to identify visually-detectable problems in operation of the process (e.g., lag in a video displayed by the process, user interactions with the UI by mouse pointer, etc.), the time period of the visually-detectable problems may be recorded, and profiling information contained in the profiling trace for that time period may be focused upon, including contents of the CPU stack, instructions being executed, memory usage, system calls, register values, etc., to ascertain and correct problems with execution of the process.

It is noted that, in embodiments, profile trace capturer 302 may be further configured to detect and flag one or more predetermined events in the profile information, in the processing circuitry executing the process, and/or directly in the process, which may aid in troubleshooting of the process.

Figure 6:
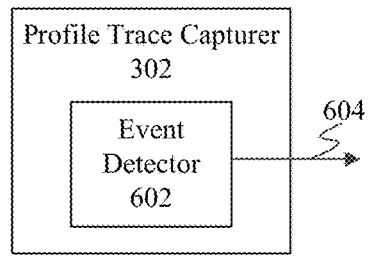
FIG. 6 shows a block diagram of a profile trace capturer configured to detect events in a process being profiled, according to an example embodiment.
Figure 7:
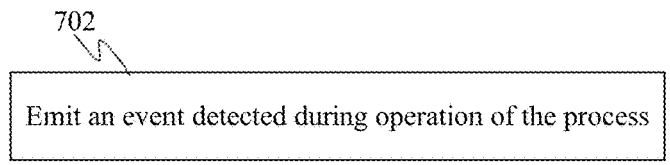
FIG. 7 shows a method for emitting events of a process being profiled, according to an example embodiment.

For instance, FIG. 6 shows a block diagram of profile trace capturer 302, according to an example embodiment. As shown in FIG. 6, profile trace capturer 302 includes an event detector 602. Event detector 602 is configured to detect events in a process being profiled, such as process 114 of FIGS. 1 and 3. In an embodiment, event detector 602 may operate according to FIG. 7. FIG. 7 shows a step 702 for emitting events of a process being profiled, according to an example embodiment. Step 702 and event detector 602 are described as follows.

In step 702, an event detected during operation of the process is emitted. Event detector 602 may be configured to detect any type of event in process 114 or processor circuit 104 executing process 114, including a lack of activity event, a memory usage threshold event, a CPU utilization value event, a network throughput threshold event, etc. Event detector 602 may detect further events, such as the developer pausing profile trace capturer 302 (e.g., during debugging), and/or other user-initiated events. Event detector 602 may emit the detected event as detected event 604, which may be used to modify operation of collector 110 in any suitable manner, including starting or stopping operation of any component of collector 110, and/or of profile analyzer 112 (FIG. 1). For instance, video capturer 306 may be caused to begin capturing video, to pause capturing video, to end capturing video, etc., based on detected event 604.

Figure 8:
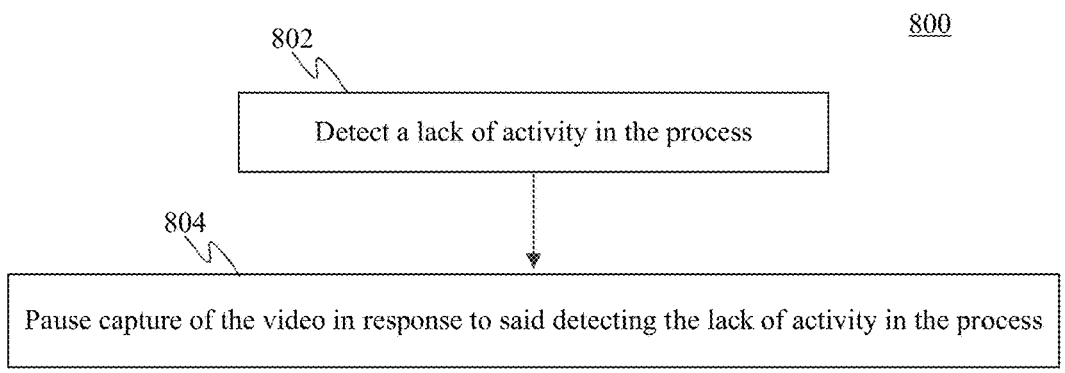
FIG. 8 shows a flowchart of a method for modifying video capture of a user interface of a process being profiled based on a detected event, according to an example embodiment.

For instance, FIG. 8 shows a flowchart 800 for pausing capture of a user interface of a process being profiled based on a detected event, according to an example embodiment. Flowchart 800 is described as follows.

In step 802 of flowchart 800, a lack of activity is detected in the process. In an embodiment, event detector 602 may be configured to detect a lack of activity in process 114 based on performance characteristics of processing circuit 104 (e.g., CPU utilization, etc.), the contents of the CPU stack (e.g., waiting for a response to a system call, waiting for a loop to complete, etc.), a lack of user interface activity, etc. For instance, event detector 602 may detect that UI 116 has changed little or not at all over a predetermined time period, indicating a lack of activity for process 114. In other embodiments, a lack of activity in process 114 may be detected by event detector 602 in other ways, as would be apparent to persons skilled in the relevant art(s) from the teachings herein. As a result, event detector 602 emits detected event 604.

In step 804, capture of the video is paused in response to said detecting the lack of activity in the process. In an embodiment, video capturer 306 receives detected event 604, which may indicate the lack of activity in process 114. In response, video capturer 306 pause capture of video 318. Video capturer 306 may pause capture of video 318 for a predetermined period of time, until receiving a resume capture of video command from event detector 602 (e.g., when event detector 602 detects resumption of activity in UI 116), or may end capture entirely.

In the manner of flowchart 800, video capturer 306 can be prevented from capturing video during periods of inactivity in UI 116, which can help the developer in avoiding wasting time watching portions of video 318 that are inactive, and thus not helpful in determining problems with process 114.

Once a profiling trace and UI video are captured for a process, a developer can analyze the profiling trace in a manner enhanced by the captured video to ascertain problems associated with the process. Such analysis can be performed in various ways in embodiments.

Figure 9:
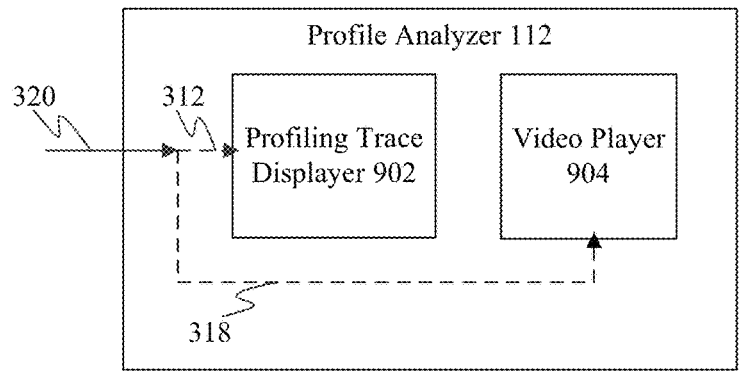
FIG. 9 shows a block diagram of a profile analyzer configured to display a profiling trace of a process correlated with a video of a user interface of the process, according to an example embodiment.
Figure 10A:
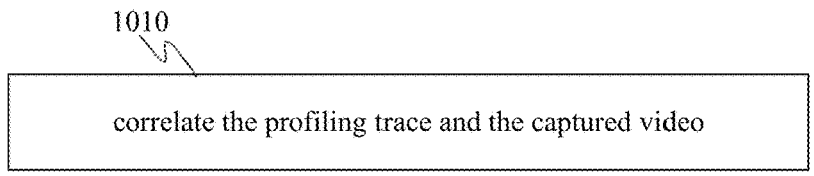
FIG. 10A shows a method for correlating collected data, according to an example embodiment.
Figure 10B:
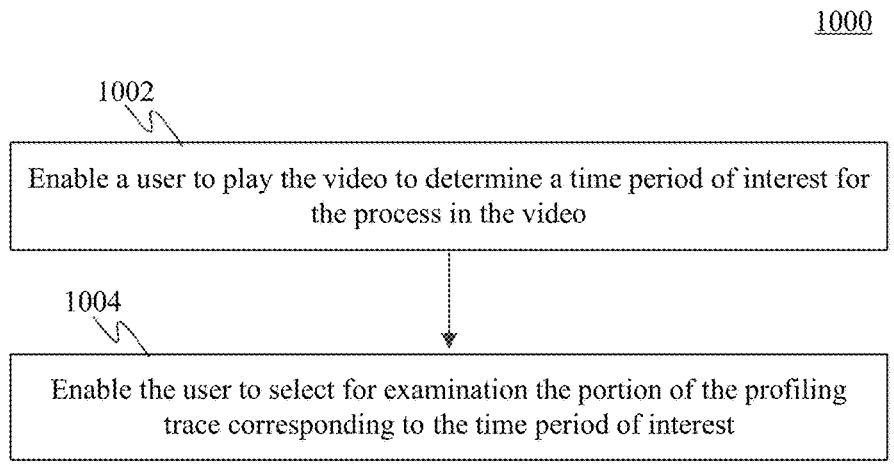
FIG. 10B shows a flowchart of a method for enabling a user to determine and examine a portion of interest of a profiling trace, according to an example embodiment.

For instance, FIG. 9 shows a block diagram of profile analyzer 112 configured to display a profiling trace of a process correlated with a video displayed of a user interface of the process, according to an example embodiment. Profile analyzer 112 of FIG. 9 enables analysis of the profiling trace in light of the video to enhance troubleshooting related to the process. As shown in FIG. 9, profile analyzer 112 includes a profiling trace displayer 902 and a video player 904. Profile analyzer 112 of FIG. 9 is described with respect to FIGS. 10A and 10B. FIG. 10A shows a step 1010 for correlating collected data, according to an example embodiment. FIG. 10B shows a flowchart 1000 for enabling a user to determine and examine a portion of interest of a profiling trace, according to an example embodiment. Profile analyzer 112 of FIG. 9. step 1010 of FIG. 10A, and flowchart 1000 of FIG. 10B are described as follows.

In step 1010 of FIG. 10A, the profiling trace and the captured video are correlated. In an embodiment, profile analyzer 112 is configured to correlate profiling trace 312 and captured video 318 of profiling trace object 320. Profiling trace 312 and captured video 318 can be correlated in various ways by profile analyzer 112 to aid in honing in on problems of process 114. For instance, a developer may view the video of the UI to identify visually-detectable problems in operation of the process (e.g., lag in a video displayed by the process, user interactions with the UI by mouse pointer, etc.), the time period of the visually-detectable problems may be recorded, and profiling information contained in the profiling trace for that time period may be focused upon, including contents of the CPU stack, instructions being executed, memory usage, system calls, register values, etc., to ascertain and correct problems with execution of the process. As described above, event detector 602 of video capturer 306 may capture events, including start, stop, pause, and/or resume events, and can emit the events to be stored in profiling trace 312. The emitted events may aid in the correlation, and may enable precise correlation of profile trace information with captured video.

The precise times of when events occur in captured video 318 may be encoded with the profiling data in profiling trace 312 by event detector 602. For instance, events may be emitted as ETW (Event Tracing for Windows®) events or other types of events. Each events may be assigned an associated QPC (QueryPerformanceCounter) timestamp (backed by a hardware register) or other type of timestamp, providing precise timing.

Flowchart 1000 of FIG. 10B shows an example of the correlating of profiling trace 312 and captured video 318. Referring to FIG. 10B, flowchart 1000 begins with step 1002. In step 1002, a user is enabled to play the video to determine a time period of interest for the process in the video. In an embodiment, profile analyzer 112 receives and un-packages profiling trace object 320, which includes profiling trace 312 and captured video 318. Video player 904 may be any suitable video player, proprietary or commercially-available, that enables display of videos. Example commercially-available video players include Windows Media® Player provided by Microsoft Corporation of Redmond, Wash., QuickTime® Player provided by Apple Corporation of Cupertino, Calif., etc.

Video player 904 receives captured video 318. A developer is enabled to play captured video 318 by interacting with video player 904. The developer watches display of captured video 318 in a user interface of profile analyzer 112 (e.g., profiler UI 408 of FIG. 4). By interacting with video player 904, the developer may be enabled to pause play, to fast-forward, to rewind, and/or to otherwise control display of captured video 318. As the developer watches captured video 318, the developer may notice indications of problems with process 114 in captured video 318, such as lag in displayed video, glitches, interactions by a user of process 114 with UI 116 (e.g., mouse pointer movements, button clicks, entered text, etc.), etc. The developer may wish to correlate times at which these problem indications occurred with the corresponding portions of profiling trace 312.

Figure 11:
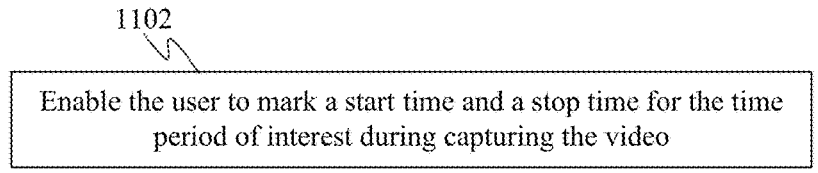
FIG. 11 shows a method for marking times of interest for a video of a user interface of a process being profiled, according to an example embodiment.

For instance, FIG. 11 shows a step 1102 for marking times of interest for a video of a user interface of a process being profiled, according to an example embodiment. In particular, in step 1102, the user is enabled to mark a start time and a stop time for the time period of interest during capturing the video. In an embodiment, video player 904 may be configured to enable the developer to mark start and stop times, and/or any other times of interest, by interacting with the user interface of profile analyzer 112. For instance, the developer may be enable to click on a time line of play of captured video 318 in video player 904 to cause a graphical mark to be indicated at the particular time. The developer may mark a time at which the developer first notices problems in captured video 318 as a start time, and when the developer sees the problems cease (at least temporarily), the developer may mark the time as a stop time. The developer may be enabled to mark as many start and stop times as desired, as well as any other time points of interest.

Referring back to FIG. 10B, in step 1004, the user is enabled to select for examination the portion of the profiling trace corresponding to the time period of interest. Profiling trace displayer 902 receives profiling trace 312. A developer is enabled to view profiling trace 312 by interacting with profiling trace displayer 902. In an embodiment, profiling trace displayer 902 may include one or more controls that the developer can interact with to select one or more times and/or time periods of profiling trace 312 to view and analyze. For instance, a control may enable the developer to forward or reverse to the time(s) of interest in captured video 318 marked using video player 904 (e.g., in step 1102 of FIG. 11), which may be indicative of problems with process 114. In this manner, the developer is enabled to more easily troubleshoot process 114.

In another embodiment, profiling trace 312 and captured video 318 may be viewed simultaneously (e.g., side-by-side or top-bottom) such that the times of interest marked in captured video 318 may be viewed simultaneously with same-time profile data in profiling trace 312. By matching up the times of viewing both, the developer can view contents of the CPU stack, determine which instructions/functions are running, determine how long instructions/functions took to complete, determine function calls, etc., that occur during the marked time(s) in captured video 318. The developer may then edit (e.g., using a code editor) the underlying source code for process 114 to correct the problems, and therefore create a better functioning process 114.

III. Example Mobile and Stationary Device Embodiments

Computing device 102, processor circuit 104, profiler tool 108, process information collector 110, profile analyzer 112, profile trace capturer 302, window handle determiner 304, video capturer 306, captured data packager 308, event detector 602, profiling trace displayer 902, video player 904, flowchart 200, step 502, step 702, flowchart 800, step 1102, and flowchart 1000 may be implemented in hardware, or hardware combined with software and/or firmware. For example, profiler tool 108, process information collector 110, profile analyzer 112, profile trace capturer 302, window handle determiner 304, video capturer 306, captured data packager 308, event detector 602, profiling trace displayer 902, video player 904, flowchart 200, step 502, step 702, flowchart 800, step 1102, and/or flowchart 1000 may be implemented as computer program code/instructions configured to be executed in one or more processors and stored in a computer readable storage medium. Alternatively, profiler tool 108, process information collector 110, profile analyzer 112, profile trace capturer 302, window handle determiner 304, video capturer 306, captured data packager 308, event detector 602, profiling trace displayer 902, video player 904, flowchart 200, step 502, step 702, flowchart 800, step 1102, and/or flowchart 1000 may be implemented as hardware logic/electrical circuitry.

For instance, in an embodiment, one or more, in any combination, of profiler tool 108, process information collector 110, profile analyzer 112, profile trace capturer 302, window handle determiner 304, video capturer 306, captured data packager 308, event detector 602, profiling trace displayer 902, video player 904, flowchart 200, step 502, step 702, flowchart 800, step 1102, and/or flowchart 1000 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 12:
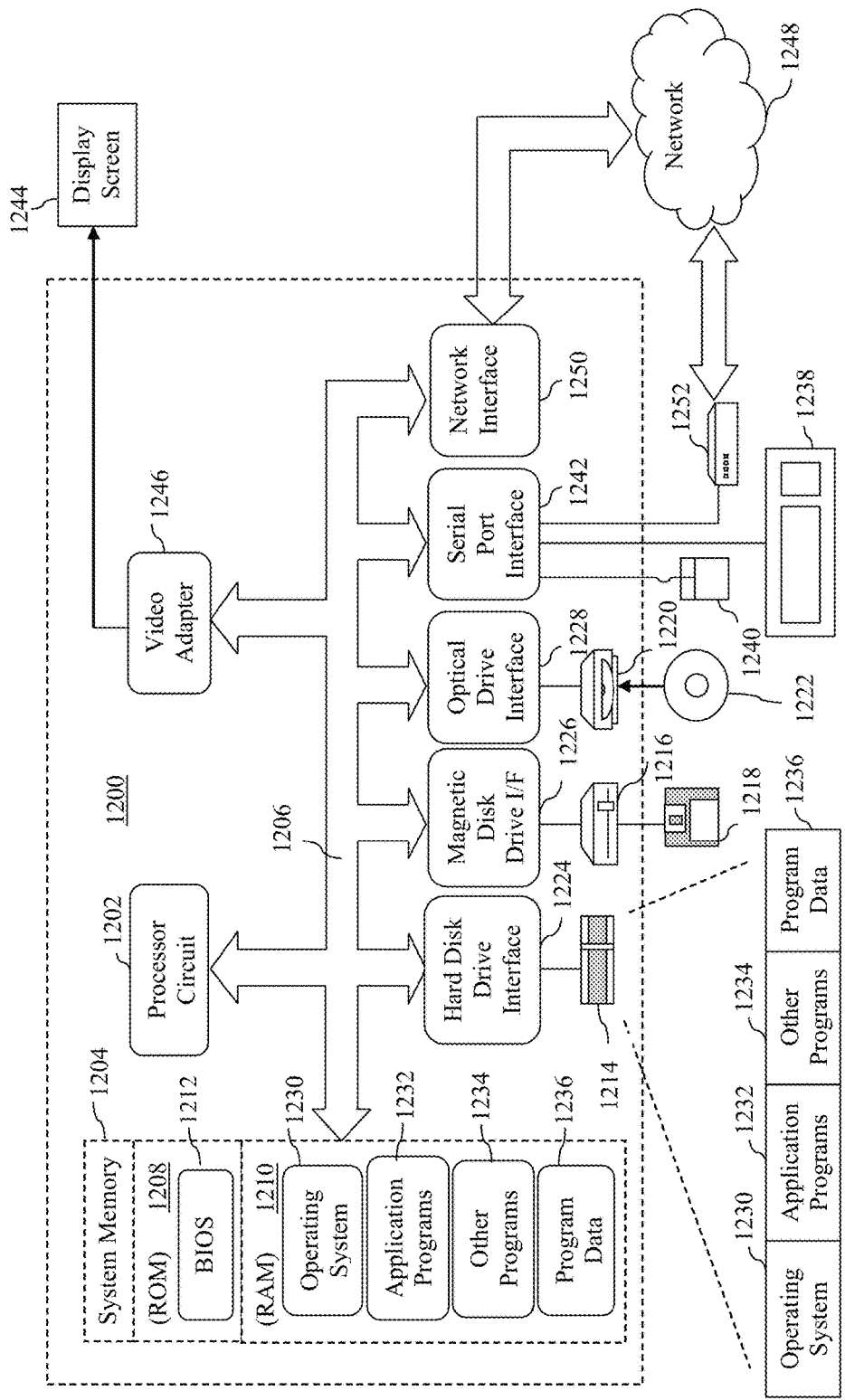
FIG. 12 shows a block diagram of an example computing device that may be used to implement embodiments.

FIG. 12 depicts an exemplary implementation of a computing device 1200 in which embodiments may be implemented. For example, computing device 102 and/or client computing device 104 may be implemented in one or more computing devices similar to computing device 1200 in stationary or mobile computer embodiments, including one or more features of computing device 1200 and/or alternative features. The description of computing device 1200 provided herein is provided for purposes of illustration, and is not intended to be limiting. Embodiments may be implemented in further types of computer systems, as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computing device 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing profiler tool 108, process information collector 110, profile analyzer 112, profile trace capturer 302, window handle determiner 304, video capturer 306, captured data packager 308, event detector 602, profiling trace displayer 902, video player 904, flowchart 200, step 502, step 702, flowchart 800, step 1102, and/or flowchart 1000 (including any suitable step of flowcharts 200, 800, and 1000), and/or further embodiments described herein.

A user may enter commands and information into the computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, virtual keyboard, etc.). In addition to display screen 1244, computing device 1200 may include other peripheral output devices (not shown) such as speakers and printers.

Computing device 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1242, or any other interface type. Such computer programs, when executed or loaded by an application, enable computing device 1200 to implement features of embodiments discussed herein. Accordingly, such computer programs represent controllers of the computing device 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

VI. Example Embodiments

In an embodiment, a method in a computing device comprises: capturing a profiling trace of a process during execution of the process; determining a window handle associated with the process; capturing video of a displayed window having the window handle during said capturing a profiling trace; and storing the captured profiling trace and the video in a profiling trace object.

In an embodiment, the capturing video comprises: capturing video of the displayed window having the window handle during said capturing a profiling trace, the displayed window displaying a user interface of the process.

In an embodiment, the determining comprises: determining a root window handle associated with the process, the root window handle being a handle for a displayed root window that includes a sub-window that displays a user interface of the process.

In an embodiment, the correlating comprises: emitting start/stop/pause/resume information from video capture into profiling data for correlation.

In an embodiment, the capturing a profiling trace comprises: emitting an event detected during operation of the process.

In an embodiment, the emitting comprises: detecting a lack of activity in the process; and pausing said capturing video in response to said detecting the lack of activity in the process.

In an embodiment, the method further comprises: correlating the profiling trace and the captured video.

In an embodiment, the method further comprises: analyzing the process by enabling a user to play the video to determine a time period of interest for the process in the video; and enabling the user to select for examination the portion of the profiling trace corresponding to the time period of interest.

In an embodiment, the enabling a user to play the video to determine a time period of interest for the process in the video comprises: enabling the user to mark a start time and a stop time for the time period of interest during said capturing video.

In another embodiment, a computing device comprises: at least one processor circuit; and at least one memory that stores instructions configured to be executed by the at least one processor circuit, the instructions configured to perform operations for correlating a user interface of a process with a profiling information for the process, the operations comprising: capturing a profiling trace of a process during execution of the process; determining a window handle associated with the process; capturing video of a displayed window having the window handle during said capturing a profiling trace; and storing the captured profiling trace and the video in a profiling trace object.

In an embodiment, the capturing video comprises: capturing video of the displayed window having the window handle during said capturing a profiling trace, the displayed window displaying a user interface of the process.

In an embodiment, the determining comprises: determining a root window handle associated with the process, the root window handle being a handle for a displayed root window that includes a sub-window that displays a user interface of the process.

In an embodiment, the capturing a profiling trace comprises: emitting an event detected during operation of the process.

In an embodiment, the emitting comprises: detecting a lack of activity in the process; and pausing said capturing video in response to said detecting the lack of activity in the process.

In an embodiment, the operations further comprise: correlating the profiling trace and the captured video.

In an embodiment, the operations further comprise: analyzing the process by enabling a user to play the video to determine a time period of interest for the process in the video; and enabling the user to select for examination the portion of the profiling trace corresponding to the time period of interest.

In an embodiment, the enabling a user to play the video to determine a time period of interest for the process in the video comprises: enabling the user to mark a start time and a stop time for the time period of interest during said capturing video.

In another embodiment, a system in a computing device comprises: a profile trace capturer configured to capture a profiling trace of a process during execution of the process; a window handle determiner configured to determine a window handle associated with the process; a video capturer configured to capture video of a displayed window having the window handle during capture of the profiling trace; and a captured data packager configured to store the captured profiling trace and the video in a profiling trace object.

In an embodiment, the displayed window displays a user interface of the process.

In an embodiment, the window handle determiner is configured to determine a root window handle associated with the process, the root window handle being a handle for a displayed root window that includes a sub-window that displays a user interface of the process.

In an embodiment, the profile trace capturer is configured to emit an event detected during operation of the process.

In an embodiment, the profile trace capturer is configured to detect a lack of activity in the process and pause said capturing video in response to said detecting the lack of activity in the process.

In an embodiment, the system further comprises: a profile analyzer configured to analyze the process, the profile analyzer configured to enable a user to play the video to determine a time period of interest for the process in the video, and enable the user to select for examination the portion of the profiling trace corresponding to the time period of interest.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
   capturing a profiling trace of a process during execution of the process;
   determining a window handle associated with the process;
   capturing video of a displayed window having the window handle during said capturing a profiling trace, said capturing video of the displayed window comprising:
     detecting a lack of activity in the process; and
     pausing said capturing video in response to said detecting the lack of activity in the process;
   storing the captured profiling trace and the video in a profiling trace object;

providing a user interface enabling a user to mark a start time and a stop time in the video corresponding to a time period of interest; and displaying the profiling trace corresponding to the time period of interest.

2. The method of claim 1, wherein said capturing video comprises:

capturing video of the displayed window having the window handle during said capturing a profiling trace, the displayed window displaying a user interface of the process.

3. The method of claim 1, wherein said determining comprises:

determining a root window handle associated with the process, the root window handle being a handle for a displayed root window that includes a sub-window that displays a user interface of the process.

4. The method of claim 1, wherein said capturing a profiling trace comprises:

emitting an event detected during operation of the process.

5. The method of claim 1, further comprising:

correlating the profiling trace and the captured video.

6. The method of claim 1, further comprising:

analyzing the process by enabling a user to play the video to determine a time period of interest for the process in the video; and enabling the user to select for examination the portion of the profiling trace corresponding to the time period of interest.

7. The method of claim 1, further comprising:

resuming said capturing video in response to detecting a resumption of activity in the process.

8. A computing device, comprising:

at least one processor circuit; and at least one memory that stores instructions configured to be executed by the at least one processor circuit, the instructions configured to perform operations for correlating a user interface of a process with a profiling information for the process, the operations comprising:

capturing a profiling trace of a process during execution of the process;

determining a window handle associated with the process;

capturing video of a displayed window having the window handle during said capturing a profiling trace, said capturing video comprising:

detecting a lack of activity in the process; and pausing said capturing video in response to said detecting the lack of activity in the process;

storing the captured profiling trace and the video in a profiling trace object;

providing a user interface enabling a user to mark a start time and a stop time in the video corresponding to a time period of interest; and displaying the profiling trace corresponding to the time period of interest.

9. The computing device of claim 8, wherein said capturing video comprises:

capturing video of the displayed window having the window handle during said capturing a profiling trace, the displayed window displaying a user interface of the process.

10. The computing device of claim 8, wherein said determining comprises:

determining a root window handle associated with the process, the root window handle being a handle for a displayed root window that includes a sub-window that displays a user interface of the process.

11. The computing device of claim 8, wherein said capturing a profiling trace comprises:

emitting an event detected during operation of the process.

12. The computing device of claim 8, wherein the operations further comprise:

correlating the profiling trace and the captured video.

13. The computing device of claim 8, wherein the operations further comprise:

analyzing the process by enabling a user to play the video to determine a time period of interest for the process in the video; and enabling the user to select for examination the portion of the profiling trace corresponding to the time period of interest.

14. The computing device of claim 8, further comprising:

resuming said capturing video in response to detecting a resumption of activity in the process.

15. A system in a computing device, comprising:

a profile trace capturer configured to:

capture a profiling trace of a process during execution of the process, and detect a lack of activity in the process;

a window handle determiner configured to determine a window handle associated with the process;

a video capturer configured to:

capture video of a displayed window having the window handle during capture of the profiling trace, and pause said capture of video in response to the detection of the lack of activity in the process;

a captured data packager configured to store the captured profiling trace and the video in a profiling trace object;

a video player configured to enable a user to mark a start time and a stop time in the video corresponding to a time period of interest; and a profiling trace displayer configured to display the profiling trace corresponding to the time period of interest.

16. The system of claim 15, wherein the displayed window displays a user interface of the process.

17. The system of claim 15, wherein the window handle determiner is configured to determine a root window handle associated with the process, the root window handle being a handle for a displayed root window that includes a sub-window that displays a user interface of the process.

18. The system of claim 15, wherein the profile trace capturer is configured to emit an event detected during operation of the process.

19. The system of claim 15, further comprising:

a profile analyzer configured to analyze the process, the profile analyzer configured to enable a user to play the video to determine a time period of interest for the process in the video, and enable the user to select for examination the portion of the profiling trace corresponding to the time period of interest.

20. The system of claim 15, wherein the video capturer is configured to the capture of video in response to a detection of a resumption of activity in the process.

* * * * *